United States Patent

[11] 3,590,443

| [72] | Inventor | Erwin H. Kubsch<br>2111 Brookside Ave., Omaha, Nebr. 68124 |
|---|---|---|
| [21] | Appl. No. | 31,157 |
| [22] | Filed | Apr. 23, 1970 |
| [45] | Patented | July 6, 1971 |

[54] HAND-RELEASEABLE SAFETY COUPLING FOR ANNULATED MEMBERS
8 Claims, 4 Drawing Figs.

[52] U.S. Cl. .................................................... 24/73 HH,
59/88, 24/232
[51] Int. Cl. .................................................... A44b 21/00
[50] Field of Search ........................................... 24/242,
241, 232, 233, 234, 74, 73 TH, 73 HR, 73, 73 B,
73 CE, 73 AC, 73 SB; 59/87, 88, 89

[56] References Cited
UNITED STATES PATENTS

| 955,070 | 4/1910 | Hornabach | 24/73 |
|---|---|---|---|
| 380,990 | 4/1888 | Carter & Louther | 24/73 |
| 751,614 | 2/1904 | Cotten | 59/88 |
| 1,754,042 | 4/1930 | Port | 59/87 |

*Primary Examiner*—Bobby R. Gay
*Assistant Examiner*—Garry Moore
*Attorney*—George R. Nimmer ABSTRACT: There is provided a secure coupling between annulated members such as a multilink flexible chain, a rope carrying circular rings, etc. The coupling provides a secure connection between the annulated members whether such members to be taut or slack under use conditions; however, the coupling can be released manually, without the use of ancillary tools, to effect relative detachment between the annulated members. The safety coupling comprises a pair of nestably broadly abuttable generally S-shaped mirror-imaged plates, a medial portion of the respective plates being pivotably attached to provide relative rotation about a common transverse-axis, there being moderate tension means tending to resiliently urge one plate toward the other plate and maintaining the interplates nestable abutment.

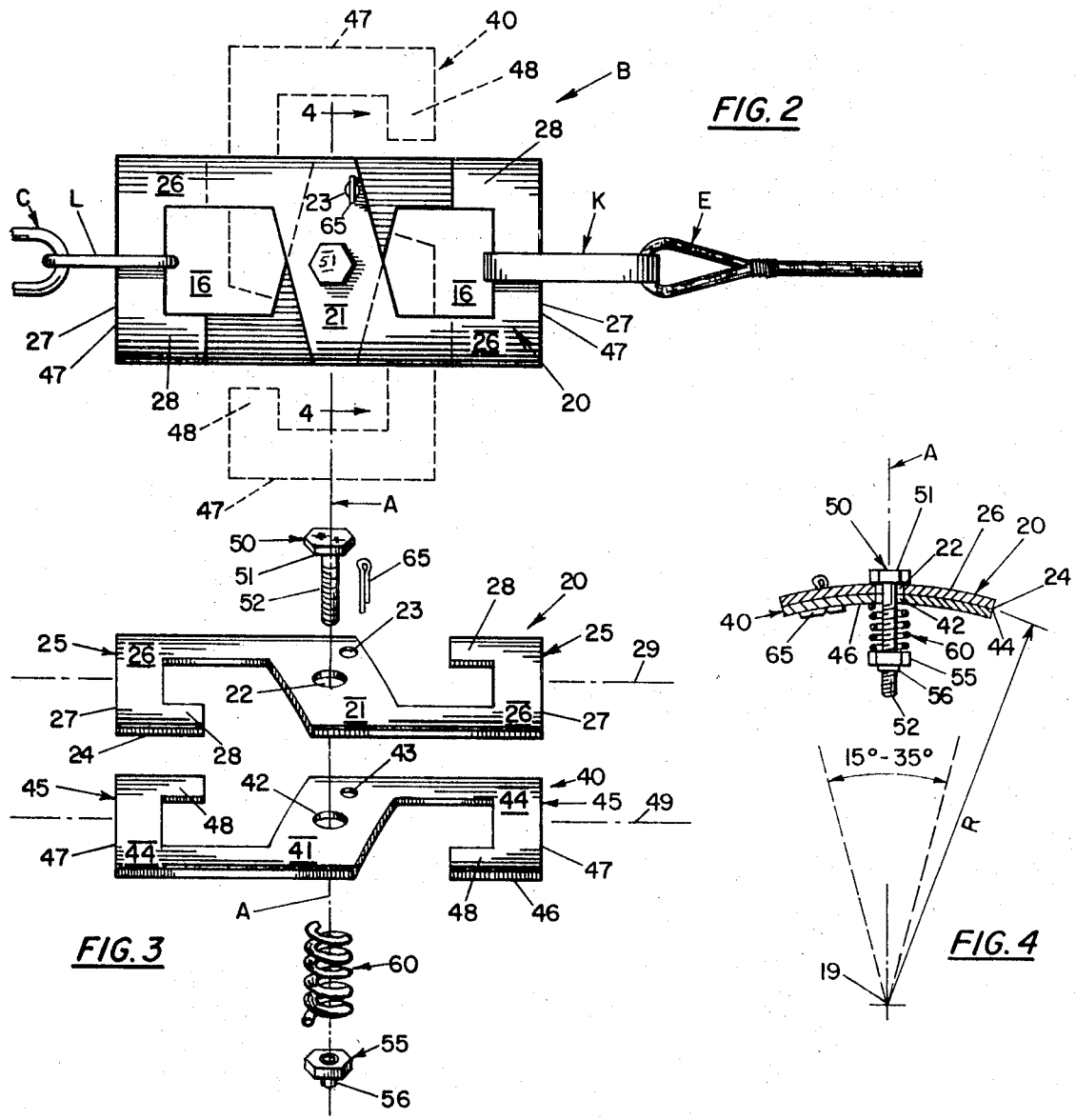
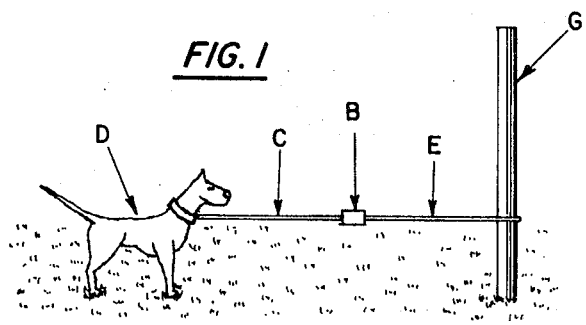

HAND-RELEASEABLE SAFETY COUPLING FOR ANNULATED MEMBERS

The prior art teaches several types of coupling devices for connecting a plurality of annulated members, such as multilink flexible chain, ropes provided with fasteners such as circular rings, etc. Many of the prior art coupling devices are appropriate only for taut annulated members, such as tire chains, and in such cases especially wrenches, pliers, or other special tools are required to manipulate the coupling device when attaching and detaching the annulated members. Some prior art coupling devices are so designed that they can be employed only for taut, or only for slack, annulated members, but not for both types. Accordingly, it is the general object of the present invention to provide a coupling device: that ensures a safe and secure connection between annulated members under a variety of use conditions, including either for taut or slack annulated flexible members; that is easy to manually attach and detach from annulated members without the use of special tools; that is easy to fabricate; and that is of a construction markedly resistant to and relatively unaffected by dirt, rust, and other normally corrosive and fouling environments.

With the above and other objects and advantages in view, which will become more apparent as this description proceeds, the hand-releasable safety coupling for annulated members comprises a pair of longitudinally extending elongate generally S-shaped plates, each said plate having a pair of hooked portions longitudinally separated by a medial portion intersecting a transverse-axis common to both plates, the plates being pivotably associated whereby there is a relative rotatable relationship about said transverse-axis, the two hooked portions of one plate extending in the clockwise direction about said transverse-axis and with the two hooked portions of the other plate extending in the counterclockwise direction, the two plates being nestably abuttable at the elongate inner surface of each plate, the inner surface of one plate being generally longitudinally concave while the inner surface of the other plate is generally longitudinally convex, and tension means tending to resiliently urge one plate toward the other plate along the transverse-axis.

In the drawing, wherein like characters refer to like parts in the several views, and in which:

FIG. 1 is a perspective view of a typical, though nonlimiting, use situation for the safety coupling, herein as a tethering link between a domestic pet with a short length chain attached to the dog's neck and a relatively long flexible rope with a ringed terminus.

FIG. 2 is a detail plan view of a representative form of the safety coupling concept of the present invention, as might be employed ancillary to the FIG. 1 use situation.

FIG. 3 is an exploded perspective view of the FIG. 2 safety coupling embodiment.

FIG. 4 is a sectional elevational view taken along line 4—4 of FIG. 2.

Referring initially to FIG. 1, the hand-releaseable safety coupling "B" is intended primarily for connecting "annulated members," such as multilink flexible chain "C," flexible rope "E" with a ring "K" attached thereto, etc. In the arbitrarily chosen, though nonlimiting, use situation herein, one end of a multilink chain "C" is attached with a typical neck collar to dog "D," and one end of lengthy flexible rope "E" is attached to ground stake "G." A metallic circular ring annulus "K" is attached conventionally to the free end of rope "E" remote of stake "G," and there is a terminal annularly-oval link "L" at the free end of chain "C" remote of dog "D." The safety coupling "B" herein is typically employed as a tethering link between chain terminal link "L" and circular annulus "K," elements "C" and "E" being employable both tautly and under slack conditions.

Referring now to FIG. 2—4, safety coupling "B" comprises a pair of longitudinally extending elongate generally S-shaped plates including an upper first-plate 20 and a lower second-plate 40. There is a medial portion i.e. 21, 41 for each plate intersecting a common transverse-axis "A," said transverse-axis being substantially perpendicular to the respective plates and specifically to the respective inner-surfaces 24 and 44, and to the respective outer-surfaces 26 and 46. Each of said plates has a single hooked portion longitudinally separated by the medial portion, herein plate 20 having two hooked portions 25 and plate 40 having two hooked portions 45. Each of said plates has a pair of longitudinally extending opposed broad surfaces including an inner-surface and an outer-surface. The respective inner-surfaces 24 (the lower concave surface of upper plate 20) and 44 (the upper convex surface of lower plate 40) face each other and are directly abuttably nestable.

The medial portion 21 of upper first plate 20 has a medial-opening 22 therethrough at transverse-axis "A," and might also have at least one offset-hole 23 parallel to but remote from "A." First-plate 20 has a longitudinal axis 29, and also has a pair of longitudinally separated lateral termini 27, herein said termini 27 being substantially perpendicular to axis 29 and both spaced substantially equidistant from "A" and 22. The respective hooked portions 25 of first-plate 20 are located immediately adjacent to the respective lateral termini 27, each hooked portion including a free end length 28 extending longitudinally toward 21, parallel to but laterally offset from axis 29. It can be seen that the two hooked portions of one plate (herein as portions 25 of first-plate 20) extend in a counterclockwise direction about transverse-axis "A," while the two hooked portions of the other plate (herein as portions 45 of second-plate 40) extend in a clockwise direction about "A."

The elongate length of first-plate 20 along axis 29 between termini 27 exceeds twice the average lateral width thereof, e.g. the lateral distance along respective termini 27. Moreover, inasmuch as lateral termini 27 are perpendicular to axis 29, the first-plate 20 can be readily formed from a generally rectangular single elongate piece of a permanently curvable metallic-plate material. For example, a rectangular ferrous piece can be drilled to provide openings 22 and 23, and then further areas of metal removed to leave the hooked portions 25. Then, the resultant shaped ferrous piece can be permanently bent as on a smoothly curvilinear mandrel to provide a curvilinear concave lower inner-surface 24 parallel to axis 29 whereupon the upper outer-surface 26 is curvilinearly convex and parallel to inner-surface 24.

The medial portion 41 of second lower-plate 40 has a medial-opening 42 therethrough at transverse-axis "A, " a longitudinal-axis 49, and might also have at least one offset-hole 43. When axes 29 and 49 are aligned as indicated in FIG. 2, medial-openings 22 and 42 are in registry and offset-holes 23 and 43 are also in registry. Hooked portions 45 include free end lengths 48 analogous to 28. Second-plate 40 differs from first-plate 20 only; in that the hooked portions 45 thereof extend in the opposite angular direction about "A," compared to the hooked portions 25; and that the inner-surface 44 is convex, rather than as concave for inner-surface 24. Preferably, as clearly indicated in FIGS. 2 and 3, the respective plates 20 and 40 geometrically and dimensionally similarly surround transverse-axis "A" so as to enhance the direct nestable abutment of said plates along inner-surfaces 24 and 44 when the plates are longitudinally aligned, as along axes 29 and 49. Moreover, with such geometric and dimensional similarity, with the plates respective lateral termini 27 and 47 being aligned, the dual-plate coupling "B" will have a pair of longitudinally separated transverse-openings 16 spaced on opposite sides of transverse-axis "A." Each said transverse-opening 16 is formed by the oppositely extending hooked portions 25 and 45 to appropriately releaseably engage desired annuli, e.g. "K," "C," etc.

The abutable curvilinear inner-surfaces 24 and 44 have a common focal-axis 19, which is substantially parallel to axes 29 and 49, whereby the radius-of-curvature "R" for surfaces 24 and 44 is constant. The degree-of-curvature for each inner-surface with respect to focal-axis 19 is substantially within the range of 15° to 35°, for reasons to be explained later in connection with the operation of coupling "B."

There is a pivotal connection between plates 20 and 40 whereby there is a relative rotational relationship between said plates about axis "A," as indicated in phantom line for second-plate 40 in FIG. 2. It is such relative rotational relationship between plates 20 and 40 which permits engagement and disengagement of coupling "B" with the desired annuli e.g. "K," "C," "L," etc. Herein, such pivotal connection is afforded with a threaded pivot-pin e.g. the threaded shank or stem 52 of headed bolt 50. Herein, bolt head 51 resets upon first-plate upper outer-surface 26 while threaded shank 52 passes through medial-openings 22 and 42. A nut 55 is threadedly engaged with shank 52 below second-plate lower outer-surface 46. Nut 55 has a secured location along the length of shank 52, and in this vein, a self-locking nut having a fibrous bushing 56 is preferred.

There is a tension means tending to resiliently urge one plate toward the other plate along said transverse-axis "A," and in this regard, a helical spring 60 surrounding axis "A" and threaded shank 52 and disposed in compression between lower plate outer-surface 46 and self-locking nut 55 is employed.

Typical operation of the safety coupling device "B" is as follows. Assuming initially that the annuli (chain link or ring on rope) are securely engaged with coupling "B" as indicated in solid line in FIGS. 2—4. So long as the tension means e.g. 60, resiliently urges the plates toward each other, and the degree-of-curvature for surfaces 24 and 44 exceeds about 15°, there is no relative rotation between said plates about tranverse-axis "A," and secure engagement to the selected annuli e.g. chain, ring, etc., is attained. When disengagement from the selected annuli is desired, the operator manually presses lower plate 40 downwardly toward nut 55, and if the degree-of-curvature for surfaces 24 and 44 is not greater than 35° with respect to focal-axis 19, lower plate 40 can be rotated about transverse-axis "A" (as indicated in phantom line in FIG. 2). A removably attached cotter pin 65 might be additionally employed through each pair of aligned offset-holes 23 to further secure coupling "B" during use.

What I claim is as follows:

1. A hand-releaseable safety coupling for annulated members, said coupling comprising: a pair of longitudinally extending elongate generally S-shaped plates including a first-plate and a second-plate, each said S-shaped plate having a medial portion intersecting a transverse-axis common to both plates, a pivotal connection disposed along said transverse-axis and extending from one plate to the other plate whereby there is provided a relative rotational relationship between plates about said transverse-axis, each said surfaces plate having a pair of hooked portions longitudinally separated by said medial portion, the two hooked portions of one plate extending generally in a clockwise direction about said transverse-axis and the two hooked portions of the other plate extending generally in a counterclockwise direction about said transverse-axis, the two hooked portions of the respective plates being substantially transversely alignable when the pivotably connected plates are longitudinally aligned to provide a pair of longitudinally separated transverse-openings for the dual-plate coupling with the said pivotal connection being disposed between said coupling transverse-openings, each of said plates having a pair of longitudinally extending broad surfaces including an inner-surface and an outer-surface, the broad inner-surface of one plate being of a longitudinally linearly-generated concave configuration and the broad inner-surface of the other plate being of a longitudinally linearly-generated convex configuration, the respective concave and convex inner-surafces of said plates directly nestably abutting each other when said two plates are longitudinally aligned, and tension means tending to resiliently urge one plate toward the other plate along said transverse-axis.

2. The safety coupling of claim 1 wherein for each plate there is a single hooked portion disposed on each side of the medial portion, each said single hooked portion including a longitudinally extending free end; wherein each plate is substantially symmetrical about said transverse-axis including a pair of longitudinally separated lateral termini disposed substantially equidistantly from said transverse-axis, and wherein the plates are geometrically and dimensionally similar to each other to enhance the said direct nestable abutment of the longitudinally aligned plates.

3. The safety coupling of claim 2 wherein the outer-surface for each plate is longitudinally linearly generated and coparallel with the inner-surface thereof whereby each plate is formable from a generally rectangular single elongate piece of a permanently curvable metallic-plate material.

4. The safety coupling of claim 3 wherein the longitudinal length for each plate exceeds at least twice the average lateral width thereof; and wherein the inner-surface of each plate has a common focal-axis whereby the radius-of-curvature for each inner-surface is substantially constant, the degree-of-curvature for each inner-surface with respect to the common focal-axis being within the substantial range of 15° to 35°; and wherein the two longitudinally extending free ends of one plate are disposed in parallelism to the two similar free ends of the other plate when both plates are longitudinally aligned.

5. The safety coupling of claim 4 wherein the pivotal connection between said plates is provided with a threaded pivot-pin disposed along said transverse-axis and extending from one plate through a medial-opening of the other plate; and therein the tension means includes a helical spring surrounding the said threaded pivot-pin and said transverse-axis, said helical spring being held against the said other plate with a nut threadedly engaged to said pivot-pin.

6. The safety coupling of claim 5 wherein the threaded pivot-pin is a threaded headed bolt passing first through a medial-opening of one plate, thence through a medial-opening of the other plate, thence through said helical spring, and finally through a self-locking nut having a fibrous bushing threadedly engaged with the bolt stem.

7. The safety coupling of claim 6 wherein there is at least one cotter pin extending transversely through the medial portion of both longitudinally aligned plates and in substantial parallelism to the said transverse-axis.

8. The safety coupling of claim 1 wherein the inner-surface of each plate has a common focal-axis whereby the radius-of-curvature for each inner-surface is substantially constant, the degree-of-curvature for each inner-surface with respect to the said common focal-axis being substantially within the range of 15° to 35°; and wherein the pivotal connection between said plates is provided with a threaded headed bolt passing through a medial-opening of both plates, thence axially through a helical spring tension means, and finally through a self-locking nut having a fibrous bushing portion threadedly engaged with the bolt stem.